United States Patent
Spinelli et al.

(10) Patent No.: US 8,843,522 B2
(45) Date of Patent: Sep. 23, 2014

(54) SYSTEMS AND METHODS FOR RAPID DELIVERY OF TIERED METADATA

(75) Inventors: Alex M. Spinelli, Mid-levels East (HK); Doron T. Houminer, Harutzim (IL); Mans Anders Olof-Ors, Lucerne (CH)

(73) Assignee: Thomson Reuters (Markets) LLC, New York, NY (US)

( * ) Notice: Subject to any disclaimer, the term of this patent is extended or adjusted under 35 U.S.C. 154(b) by 772 days.

(21) Appl. No.: 12/232,312

(22) Filed: Sep. 15, 2008

(65) Prior Publication Data

US 2010/0070538 A1    Mar. 18, 2010

(51) Int. Cl.
G06F 17/30    (2006.01)
G06Q 10/10    (2012.01)
H04L 29/08    (2006.01)

(52) U.S. Cl.
CPC .............. H04L 67/325 (2013.01); G06Q 10/10 (2013.01); *Y10S 707/943* (2013.01); *Y10S 707/95* (2013.01)
USPC ........... 707/791; 707/769; 707/793; 707/943; 707/950

(58) Field of Classification Search
CPC .............................. G06F 21/10; G06F 11/1435
USPC .......................... 707/791, 793, 769, 943, 950
See application file for complete search history.

(56) References Cited

U.S. PATENT DOCUMENTS

| | | | |
|---|---|---|---|
| 5,163,131 A | 11/1992 | Row et al. | |
| 5,862,325 A * | 1/1999 | Reed et al. | 709/201 |
| 6,405,162 B1 | 6/2002 | Segond et al. | |
| 6,769,018 B2 * | 7/2004 | Gagnon | 709/218 |
| 7,003,522 B1 | 2/2006 | Reynar et al. | |
| 7,032,174 B2 | 4/2006 | Montero et al. | |
| 7,124,354 B1 | 10/2006 | Ramani et al. | |
| 7,146,383 B2 | 12/2006 | Martin et al. | |
| 7,305,415 B2 | 12/2007 | Vernau et al. | |
| 7,398,324 B2 * | 7/2008 | Brennan et al. | 709/246 |
| 7,433,876 B2 | 10/2008 | Spivack et al. | |
| 7,555,455 B2 * | 6/2009 | Agarwal et al. | 705/37 |
| 7,853,478 B2 * | 12/2010 | Donahue et al. | 705/14.43 |
| 8,001,129 B2 * | 8/2011 | Arumainayagam et al. | 707/749 |
| 2002/0108115 A1 * | 8/2002 | Palmer | 725/50 |
| 2003/0135826 A1 | 7/2003 | Dozier | |
| 2005/0015709 A1 * | 1/2005 | Lavoie et al. | 715/500 |
| 2005/0235031 A1 | 10/2005 | Schneider et al. | |
| 2005/0262428 A1 | 11/2005 | Little et al. | |
| 2006/0036461 A1 | 2/2006 | Chuah et al. | |

(Continued)

OTHER PUBLICATIONS

International Search Report from corresponding Application No. PCT/US2009/05118 (Oct. 30, 2009).

(Continued)

*Primary Examiner* — Thanh-Ha Dang
(74) *Attorney, Agent, or Firm* — Covington & Burling LLP; Gregory S. Discher; Grant D. Johnson

(57) ABSTRACT

In one embodiment of the present invention, a computer-implemented method includes receiving a set of alphanumeric information. A first set of metadata is generated that is associated with the alphanumeric information, and a second set of metadata is generated that is associated with the alphanumeric information. The first set of metadata is transmitted at a first time and the second set of metadata is transmitted at a second time subsequent to the first time. The first and/or second sets of metadata can be used to trigger an automated trade of a security.

20 Claims, 8 Drawing Sheets

(56) References Cited

U.S. PATENT DOCUMENTS

| | | | |
|---|---|---|---|
| 2006/0242489 A1* | 10/2006 | Brockway et al. | 714/718 |
| 2006/0259781 A1* | 11/2006 | Saeki et al. | 713/189 |
| 2007/0067211 A1* | 3/2007 | Kaplan et al. | 705/10 |
| 2007/0118803 A1 | 5/2007 | Walker et al. | |
| 2007/0233585 A1* | 10/2007 | Ben Simon et al. | 705/35 |
| 2008/0021895 A1 | 1/2008 | Stevenson et al. | |
| 2008/0028286 A1 | 1/2008 | Chick | |
| 2008/0072054 A1* | 3/2008 | Choi | 713/176 |
| 2008/0127289 A1 | 5/2008 | Julia et al. | |
| 2008/0183639 A1* | 7/2008 | DiSalvo | 705/36 R |
| 2008/0275859 A1 | 11/2008 | Griffith | |
| 2008/0300984 A1* | 12/2008 | Li | 705/14 |
| 2008/0306913 A1 | 12/2008 | Newman et al. | |
| 2009/0055405 A1 | 2/2009 | Brier et al. | |

OTHER PUBLICATIONS

Written Opinion of the International Searching Authority from corresponding Application No. PCT/US2009/05118 (Oct. 30, 2009).

"Best Practices for Structural Metadata," Version 1, Yale University Library, Jun. 1, 2008.

Non-Final Office Action issued on Apr. 13, 2011 in U.S. Appl. No. 12/453,397, filed May 8, 2009.

Final Office Action issued on Aug. 17, 2011 in U.S. Appl. No. 12/453,397, filed May 8, 2009.

International Search Report from corresponding Application No. PCT/US2010/001368 (Jun. 24, 2010).

\* cited by examiner

SYSTEMS AND METHODS FOR RAPID DELIVERY OF TIERED METADATA

FIELD OF EMBODIMENTS OF THE INVENTION

Embodiments of the present invention generally relate to rapid delivery of media content via one or more networks and, more particularly, to rapidly searching electronic media content and transmitting at least two sets of metadata associated with the electronic media content.

BACKGROUND OF EMBODIMENTS OF THE INVENTION

The advent of modern computing and networking technologies has brought about an explosion of information that is becoming more and more available to the public. Widespread access to networks, such as the Internet and Intranets, has fueled robust growth in demand for both media content and delivery channels which, in turn, has increased the desire for rapid access to news and information, local content such as emails and electronic documents, and metadata pertaining thereto. Metadata is generally defined as "data about data." In a content management and information architecture, metadata generally refers to information about objects, such entities. Thus, metadata can pertain to information about a document, an image, news stories, information on blogs, and so on.

A number of vendors, organizations, consortiums, international standards bodies, and working groups are developing (or have developed) metadata recommendations and standards. For example, the IFLA (The International Federation of Library Associations and Institutions), is an international body representing the interests of library and information services and their users. See IFLA website. The IETF (Internet Engineering Task Force) has a number of projects underway to define metadata usage on the Internet and Web, such as the Common Indexing Protocol (CIP), and the URN (Uniform Resource Name).

The Handle System® is a distributed computer system which stores names, or handles, of digital items and which can quickly resolve those names into the information necessary to locate and access the items. It was designed by CNRI (Corporation for National Research Initiatives®) as a general purpose global system for the reliable management of information on networks such as the Internet over long periods of time and is currently in use in a number of prototype projects, including efforts with the Library of Congress, the Defense Technical Information Center, the International DOI® (Digital Object Identifier) Foundation, and the National Music Publishers' Association.

In addition, the World Wide Web Consortium's (W3C) Metadata Activity Group is developing ways to model and encode metadata. The group has developed RDF (Resource Description Framework) and PICS (Platform for Internet Content Selection). See World Wide Web Consortium's website information pertaining to metadata. Finally, the Dublin Core is an attempt at standardizing a core set of metadata elements. RFC 2413 (Dublin Core Metadata for Resource Discovery, September 1998) describes the metadata elements. See Dublin Core website.

Descriptive metadata may describe information that identifies resources that enable searching and retrieving at the web-level. For example, descriptive metadata may be used to facilitate searching the Web to find an image collection pertaining to major league baseball players, and/or enable users to discover resources pertaining to digitized collections of information pertaining to the Civil War. Structural metadata may be used to facilitate navigation and presentation of electronic resources, and provide information about the internal structure of resources including page, section, chapter numbering, indexes, and table of contents. Structural metadata may also be used, for example, to describe relationships among materials (e.g., photograph B was included in manuscript A) and/or bind related files and scripts (e.g., File A is the JPEG format of the archival image File B).

The ability to quickly gather large amounts of unstructured content, such as news information, emails, and locally stored electronic documents and content, and distribute relevant information to end-users may provide a competitive advantage to such end users. For example, providing metadata pertaining to financial news stories to end users in a rapid manner may enable end users to acquire and use this information before others can gain access to and react to the information.

There are known systems that have been utilized in efforts to rapidly provide metadata to end users. Typically, these schemes complete the entire formation of metadata before transmitting any metadata to client computers or processing devices.

Aspects of the present invention are directed to formulating metadata pertaining to unstructured content such as news information, emails, and locally stored electronic documents, and to providing staged delivery of metadata, with each stage providing an increasing amount of metadata content, for example, to client computers and/or end-users in a manner that overcomes certain limitations associated with known systems and methods.

SUMMARY OF EMBODIMENTS OF THE INVENTION

Embodiments of the present invention are directed to expanding the capability of generating metadata associated with unstructured content such as news stories, instant messaging records, emails, blog content, and so on. Aspects of various embodiments of the present invention add classification or categorization scheme topic codes, for example, to unstructured electronic content such as news stories and emails, as well as provide metadata classification or categorization in connection with entity and fact extraction. These processes are performed in a manner that does not add significant latency prior to transmitting, for example, the categorization-related metadata, entity-related metadata and fact-related metadata as they each become available, to end users, client systems and/or other computing devices such as a cell phone or personal digital assistant.

Embodiments of the present invention are also directed to providing tiered transmission of increasing amounts of metadata to end users, client systems and/or other computing devices such as a cell phone or personal digital assistant. The metadata can correspond to a classification or categorization of subject matter within a document such as a news story or an email. The metadata can also be associated with or correspond to entities within the news story or email, and facts within the news story or email. Embodiments of the invention are directed to providing to end users, client systems and/or other computing devices respectively increasing amounts of metadata associated with each of the subject matter, entities and facts within, for example, a news story, email, or any other form of written text.

Embodiments of the present invention are also directed to providing metadata "on-demand," so that as the metadata is made available, the client application will be able to retrieve it. Embodiments of the invention also enable client-side control of the trade-off between the amount of metadata provided and the speed at which the client-side receives the metadata.

In one embodiment of the present invention, a computer-implemented method includes receiving a set of alphanumeric information (e.g., an e-mail, an instant message, or an electronic document), generating a first set of metadata associated with the alphanumeric information, generating a second set of metadata associated with the alphanumeric information, and transmitting the first set of metadata at a first time and the second set of metadata at a second time. The alphanumeric information can be a news story, such a new story related to and/or include financial information. The second time will generally be no later than one hour after the first time. In another embodiment, the second time is no later than five seconds after the first time.

The first set of metadata can pertain to a subject matter of the alphanumeric information, and the second set of metadata can pertain to an entity identified within the alphanumeric information. The first set of metadata can cause execution of an automated security trade. The second set of metadata can also cause execution of an automated security trade.

A third set of metadata can be generated that is associated with the alphanumeric information. The third set of metadata can be transmitted at a third time subsequent to the second time. The third set of metadata can cause execution of an automated security trade.

In another embodiment of the present invention, a system includes a computer configured for receiving a set of alphanumeric information, generating a first set of metadata associated with the alphanumeric information, generating a second set of metadata associated with the alphanumeric information, and transmitting the first set of metadata at a first time and the second set of metadata at a second time.

The first set of metadata can pertains to a subject matter of the alphanumeric information, and the second set of metadata can pertain to an entity identified with the alphanumeric information. The computer can transmit the first set of metadata using, for example, a network, to a second computer that triggers a security trade based on the first set of metadata.

The first computer can transmit the second set of metadata to a second computer, and the second computer can trigger a security trade based on the second set of metadata. The second time can be no later than 5 seconds after the first time.

The first computer can also transmit a third set of metadata associated with the alphanumeric information to a second computer, and the second computer can trigger a second security trade based on the third set of metadata.

DESCRIPTION OF EMBODIMENTS OF THE INVENTION

Figure 1:
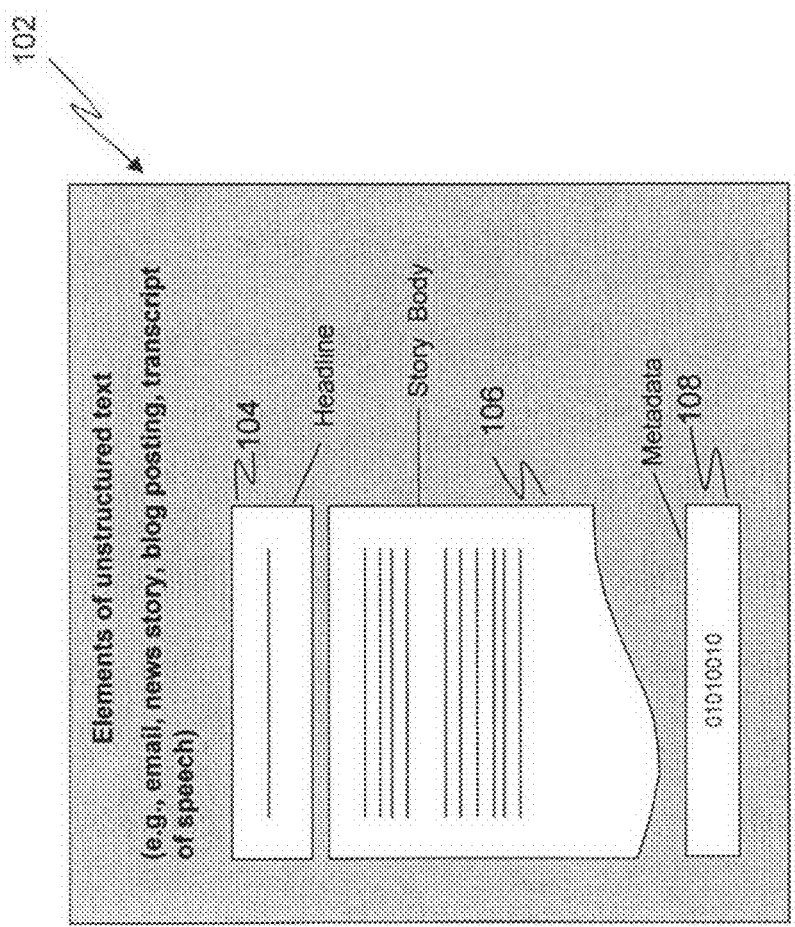
FIG. 1 is an exemplary block diagram illustrating aspects of an example of unstructured text that can be processed by various embodiments of the present invention.

FIG. 1, generally at 100, is an exemplary block diagram illustrating aspects of an example of unstructured text 102 that can be processed by various embodiments of the present invention. The unstructured text 102 could be a news story that is provided from any number of sources, such as newspapers, magazines, professional journal articles, transcriptions of speeches, live proceeding or hearings, news conferences, and the like. The unstructured text 102 could also be, for example, an email, a blog posting, or a translation of a speech, or any other form of written text. The unstructured text 102 can pertain or relate to any subject matter. For example, the unstructured text 102 could pertain or relate to business information, financial information, actual and/or expected corporate earnings, real estate information, personal finance information, tax planning information and/or strategies, investment opportunities, legal and/or regulatory developments, sports, and the like.

As shown, unstructured text 102 may include various elements, such as a subject line or headline 104, a story body 106, and metadata 108. Subject line or headline 104 includes the subject line or headline of an unstructured text 102 item, and story body 106 includes the actual words (text) of the unstructured text 102. Metadata 108 includes information about the unstructured text 102, such as the number of words in the unstructured text 102, the author of the unstructured text 102, the time and date of transmission of the unstructured text 102, the publication source (e.g., the New York Times, the Economist magazine), whether the unstructured text 102 is streamlined and/or transcribed text from a corporate earnings conference, the originating source of the unstructured text 102, and/or a unique identifier associated with the unstructured text 102.

Figure 2:
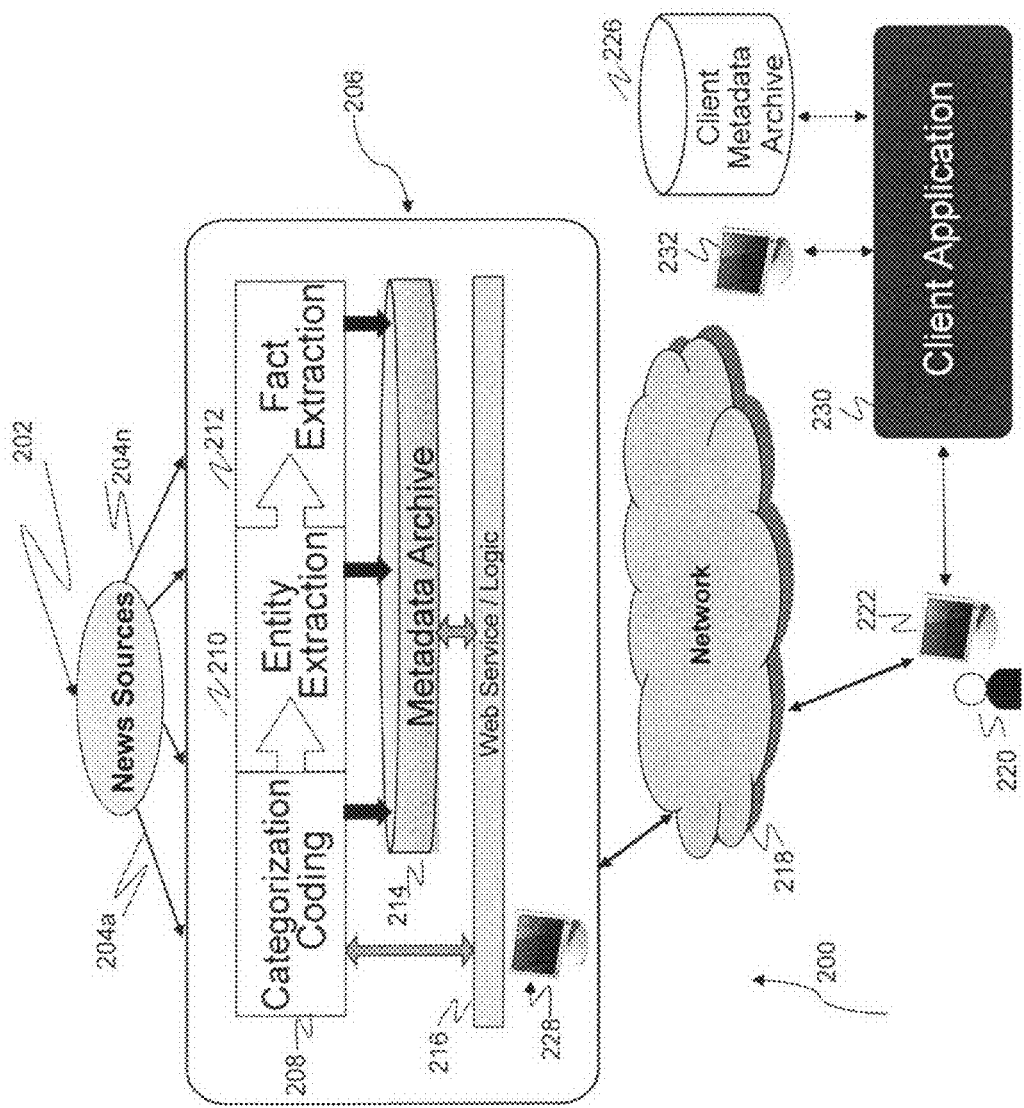
FIG. 2 is an exemplary block diagram that also serves as a flow diagram, illustrating aspects of media content flow and metadata characterization that can be performed by various embodiments of the present invention.

FIG. 2, generally at 200, is an exemplary block diagram that also serves as a flow diagram, illustrating aspects of media content flow and metadata characterization that can be performed by various embodiments of the present invention. News sources 202 such as Associated Press (AP), Thomson Reuters and/or United Press International (UPI) will typically receive and transmit unstructured text 102, for example, in the form of a news story to metadata module 206 via communication links 204a-n.

One or more of any particular news source(s) 202 can transmit any number of new stories 102 at any instant in time. For example, UPI may be transmitting, for example, five, ten, twenty, fifty, or more, news stories 102 from news source 202 to metadata module 206 at any point in time. At the same instant (or range) of time, Associated Press and/or Reuters may also be transmitting, for example, five, ten, twenty, fifty, or more, news stories 102 from news source 202 to metadata module 206 at any point in time. Communication links 204a-n represent a plurality of communication links that may be used to receive news stories 102 from a plurality of news sources 202.

Metadata module 206 includes (or utilizes) a general purpose computer 228, which is used to perform processing associated with categorization coding module 208, entity extraction module 210, and fact extraction module 212. Other tiered metadata modules can be utilized in addition to or in lieu of categorization coding module 208, entity extraction module 210, and fact extraction module 212. Examples of such modules can be a language identification module (not shown) that can identify the language of a particular word, phrase, portion of an unstructured text 102 document, or an entire unstructured text 102 document. Similarly, a sentiment analysis module (not shown) can be utilized that can identify the tone of a portion of or an entire unstructured text 102 document (e.g. optimistic, pessimistic, request for information, recommended course of action, and so on).

Computer 228 can be a general purpose computer having, for example, an Intel 2x dual core central processing unit (CPU) and 6 Gigabytes of random access memory (RAM). Computer 228 could also be a general purpose computer having, for example, two Quad core CPU's and 16 Gigabytes of RAM. Computer 228 can run one or more commercially available software packages such as Clearforest Tags, Clearforest Tags Console, Clearforest Categorization Manager, Microsoft SQL Server 2005, Windows Server 2003 and/or Java Development Kit 6 to perform certain functionality associated with metadata module 206, as will be described herein. Computer 228 can receive unstructured text 102 from news sources 204a-n. In addition, computer 228 may scan, for example, the World Wide Web (WWW) for blogs, news stories or content, and other web content that is to be processed by metadata module 206.

Within metadata module 206, news story 102 is initially processed by categorization coding module 208. Within categorization coding module 208, the news story 102 is initially assigned (or may already have) a unique identifier, such as an alphanumeric identifier that may be part of metadata 108. Categorization coding module 208 processes the content of news stories 102, and attaches or assigns topic codes to each story 102. Topic codes generally relate to subject matter contained in a story, as will described in connection with FIG. 3. For example, a topic code of MER may be used to indicate that subject matter within a news story 102 pertains to a merger between two companies. Any number of topic codes may be assigned to associated with a particular news story 102.

When system 200 receives news stories 102 from news sources 202, news stories are typically transmitted by news sources 202 in a variety of formats. For example, one news source 202 provider (e.g., Associated Press) may include all metadata 108 in a single field, whereas another news source 202 provider (e.g., Reuters) may have separate data fields for metadata 108. As an example, Reuters may have separate, dedicated data fields for each of the number of words in the news story 102, the author(s) of the news story 102, and the time and date of transmission of the news story 102. Accordingly, categorization coding module 208 (or other hardware and/or software) may need to perform data normalization so that categorization coding module 208, entity extraction module 210, and fact extraction module 212 receive and process news story 102 data in a common format.

Categorization coding module 208 may utilize any public or private classification scheme or ontology. For example, categorization coding module 208 may utilize The Open Directory Project (see, www.dmoz.org). As another example, the FTSE (Financial Times and the London Stock Exchange (UK stock index)) Global Classification System for the global equities markets may be used as a classification system. Categorization coding module 208 may also use conventional classification techniques such as hierarchies and ordered lists.

Figure 3:
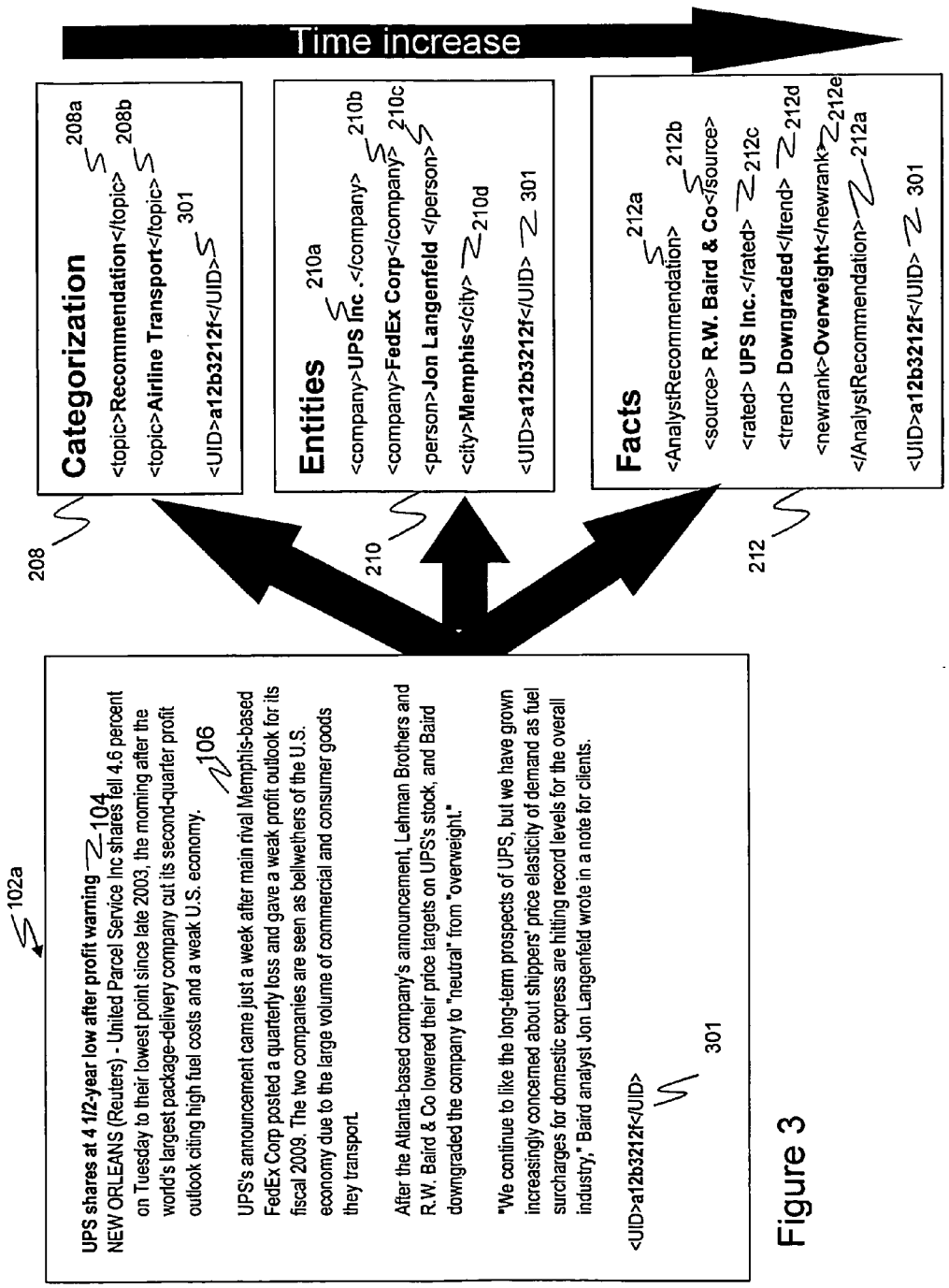
FIG. 3 is an example of unstructured text in the form of a news story, and also illustrates an example of categorization topics, entities, and facts that can be used in conjunction with metadata characterization in accordance with various embodiments of the present invention.

The topic codes generated by categorization coding module 208 are stored in an metadata archive 214. Accordingly, in embodiments of the present invention, the derived, distilled and/or extracted information from a news story 102, such as categorization coding, identification of entities, and identification of facts and events extracted from a news story 102, as will be described, for example, in connection with FIG. 3, are also considered metadata. Relationships between such derived, distilled and/or extracted information from a news story 102, as will also be described, for example, in connection with FIG. 3, are also considered as metadata.

Categorization coding module 208 may also generate a unique identifier for a news story 102 if the news story is not transmitted with a unique identifier as part of metadata 108. For example, referring to FIG. 1, a unique identifier may be provided as part of metadata 108, and transmitted to metadata module 206 from a news source 202. When utilizing an off-the shelf financial or business extraction module such as the financial/business or intelligence extraction modules provided by ClearForest (a Thomson Reuters company), Waltham, Mass., the average processing time to assign topic codes and, if necessary, a unique identifier to a typical 4 kilobyte a news story 102 is expected to be approximately 170 ms.

After categorization coding module 208 processes a news story 102, entity extraction module 210 processes the content of news stories 102 and the topic codes determined by categorization coding module 208, and determines (or defines) entities within a news story 102 that are relevant and/or can be associated with the topic codes. Entities are concepts or set of terms of particular interest, such as a person, company, organization, product, location such as a country, city and/or state, or technology. The entities generated by entity extraction module 210 are stored in an metadata archive 214. When utilizing an off-the shelf financial or business extraction module, the average processing time to assign entities to a typical 4 kilobyte a news story 102 is expected to be approximately 300 ms.

After categorization coding module 208 and entity extraction module 210 process a news story 102, the topic codes and entities applicable to a news story 102 are processed by fact extraction module 212. Facts are relationships held between two or more entities, such as, for example, the position of a person in a company, or the relationship between two or more companies in a merger or alliance. Each fact has its own set of attributes, and is created by using the metadata and entities that are extracted from each news story 102. The facts generated by fact extraction module 212 are stored in an metadata archive 214.

Fact extraction module 212 processes the content of news stories 102, the topic codes determined by categorization coding module 208, and the entities determined by entity extraction module 210, and determines facts within a news story 102 that are relevant to the topic codes and entities. When utilizing an off-the shelf financial or business extraction module, the average processing time to assign entities to a typical 4 kilobyte a news story 102 is expected to be approximately 500 ms.

Metadata archive 214 can include a first section or portion for storing categorization topics, a second section or portion for storing entities, and a third section or portion for storing facts. The first sections (or portions) of metadata archive 214 can by physically or logically separate. For example, three separate repositories 214 could be utilized, with a first repository 214a (not shown) used to store topics, a second repository 214b (not shown) can be used to store entities, and a third repository 214c (not shown) can be used to store facts. Metadata archive 214 could also have one or more logical sections that store topics, one or more logical sections that store entities, and/or one or more logical sections that store facts. Upon completion of processing of a news story 102, the topics, entities and facts that were respectively transmitted upon completion of processing and temporarily stored in metadata archive 214 can be transmitted to client computer 222 via network 218, and stored in client metadata archive 226. Client metadata archive 226 will generally also store a unique identifier that is associated with each news story 102 (or other unstructured text processed by metadata module 206). Computer 228 can access metadata archive 214 and web service/logic module 216, for example, to transmit the metadata associated with each news story 102 that is generated by categorization coding module 208, entity extraction module 210 and fact extraction module 212 to client metadata archive 226.

In operation, one or more users 220, such as an end user or a system administrator, may use a general purpose computer as a client computer 222 to determine the level of metadata that they wish to receive. In particular, in accordance with one aspect of the invention, a user 220 can specify the manner in which s/he wishes to receive metadata. For example, for time critical applications such as automated stock trades or security trades based on transmitted metadata, the user 220 can specify that, for a given news story 102, metadata module 206 should first transmit to client computer 222 the metadata generated by categorization coding module 208, next transmit to client computer 222 the metadata generated by entity extraction categorization coding module 210, and finally transmit to client computer 222 the metadata generated by fact extraction coding module 212. In such an implementation, client computer 222 can execute (and/or or provide instructions and/or triggers for execution of) certain stock or security trades based upon the metadata initially received from categorization coding module 208, and subsequently execute (and/or or provide instructions and/or triggers for execution of) additional stock or security trades based on the metadata received at a later time from entity extraction module 210. Finally, client computer 222 can execute (and/or or provide instructions and/or triggers for execution of) certain stock or security trades based upon the metadata received from fact extraction module 212.

Similarly, if receiving metadata from each of the categorization coding module 208, entity extraction module 210, and fact extraction module is not time critical, the user 220 could specify that for a given news story 102, that metadata module 206 should transmit to client computer 222 the metadata generated by categorization coding module 208, entity extraction coding module 210, and fact extraction module 212 all at once, upon completion of processing by fact extraction module 212.

FIG. 3 is an example of unstructured text in the form of a news story 102, and also illustrates an example of categorization topics, entities and facts that can be generated by categorization coding module 208 and used in conjunction with metadata characterization in accordance with various embodiments of the present invention. News story 102a contains a headline 104, a story body 106, and a unique story identifier (UID) 301. As shown in FIG. 3, categorization module 208 generates the topics of Recommendation 208a and Airline Transport 208b, and uses the UID 301 of a12b3212f that is associated with the news story 102.

Entity extraction module 210 generates the entities of company 210a and 210b, person 210c, and city 210d. Entity extraction module 210 also uses the UID 301 of a12b3212f that is associated with the news story 102. Finally, fact extraction module 212 generates facts pertaining to Analyst Recommendation 212a. Within the Analyst Recommendation 212a, there are facts pertaining to source 212b, rated 212c, trend 212d, and newrank 212e. Fact extraction module 212 also uses the UID 301 of a12b3212f that is associated with the news story 102.

As noted above, each fact has its own set of attributes, and is created by using the metadata and entities that are extracted from each news story 102. For example, the rated UPS Inc. fact as shown at 212c in FIG. 3 stems from UPS Inc. as being identified as a company by entity module 210, as shown in FIG. 3 at 210a.

In operation of one embodiment of the present invention, as topics 208a and 208b are generated by categorization coding module 208, they can be stored in metadata archive 214, and transmitted to client computer 222 via web service/logic module 216, and network 218. Client computer 222 can run a client application software package 230, that can determine, for example, whether client computer 222 should automatically execute (and/or or provide instructions and/or triggers for execution of) a stock trade based on the topics received by client computer 222. Techniques such as standard tracking of event timelines and trends can be utilized to facilitate determination of whether client computer 222 should automatically execute (and/or or provide instructions and/or triggers for execution of) a stock trade based on the topics received.

For example, client application 230 can determine, for example, whether a topic such as Airline Transport 208b is currently receiving a statistically significant increase (or decrease) of mentioning. Client computer 222 could, for example, automatically execute a trade (and/or or provide instructions and/or triggers for execution of) to buy or sell a predetermined volume of Airline-related stock based on a statistically significant (e.g., 10%) increase (or decrease) of topics pertaining to Airline Transport 208b, relative to historical patterns. In addition to or in lieu of client computer 222 executing trades (and/or or provide instructions and/or triggers for execution of), client computer 222 could also send alerts to predetermined individuals and/or organizations based on a statistically significant increase or decrease in mentioning of Airline-related topics.

Similarly, client application 230 can use entity-related criteria, such as whether a particular company is currently receiving a predetermined statistically significant increase (or decrease) of mentioning relative to historical patterns. Client computer 222 could, for example, automatically execute a trade (and/or or provide instructions and/or triggers for execution of) to buy or sell a predetermined volume of stock pertaining to the particular company 210a, 210b based on a statistically significant increase (or decrease) of references to that company.

In addition to or in lieu of client computer 222 executing trades (and/or or provide instructions and/or triggers for execution of), client computer 222 could also send alerts to predetermined individuals and/or organizations based on the statistically significant increase or decrease in references to a particular company. For example, if a particular company has had a recent spate of bad news, and the number of references to the company decreases due to a decline in the popularity of its products or services, this could trigger, for example, a sale of the company's stock and/or an alert to specified organizations and/or individuals.

Similarly, client application 230 can use criteria such as whether facts pertaining to a trend 212d (e.g., a fact of Downgraded corresponding to trend 212d, as shown in FIG. 3) or how a company is rated 212c. Client computer 222 could, for example, automatically execute a trade (and/or or provide instructions and/or triggers for execution of) to sell a predetermined volume of stock pertaining to the particular company 210*a*, 210*b* based on a fact of Downgraded corresponding to trend 212*d*, and/or provide an alert to specified organizations and/or individuals.

Client metadata archive 226 can store the data respectively generated by categorization coding module 208, entity extraction module 210 and fact extraction module 212 for future use. For example, major companies and large organization typically have, for example, hundreds of thousands of documents on proprietary Intranets. As these networks grow over time it becomes increasing difficult to search and navigate. The metadata module 206 of the present invention will enable such organization to create structure and allow important information pertaining to categorization topics, entities and facts to surface, as illustrated in FIG. 3. For example, client application 230 may be used to query multiple unstructured text 102, such as emails, instant messaging traffic, transcripts of speeches, and news feeds for entity information pertaining to a particular company 210*a* (e.g., UPS Inc) and fact information pertaining to a trend 212*d* for that company (e.g., downgraded).

Since all unstructured text 102 will be processed by the metadata module 206, metadata module 206 will generally utilize the same process and therefore provide consistent metadata across all unstructured text 102 sources. This feature pertaining to one aspect of the invention will advantageously allow and provide integration of searching and alerting, as well facilitating the provision of uncovering and retrieval of information patterns across the various forms of unstructured data 102.

Figure 4:
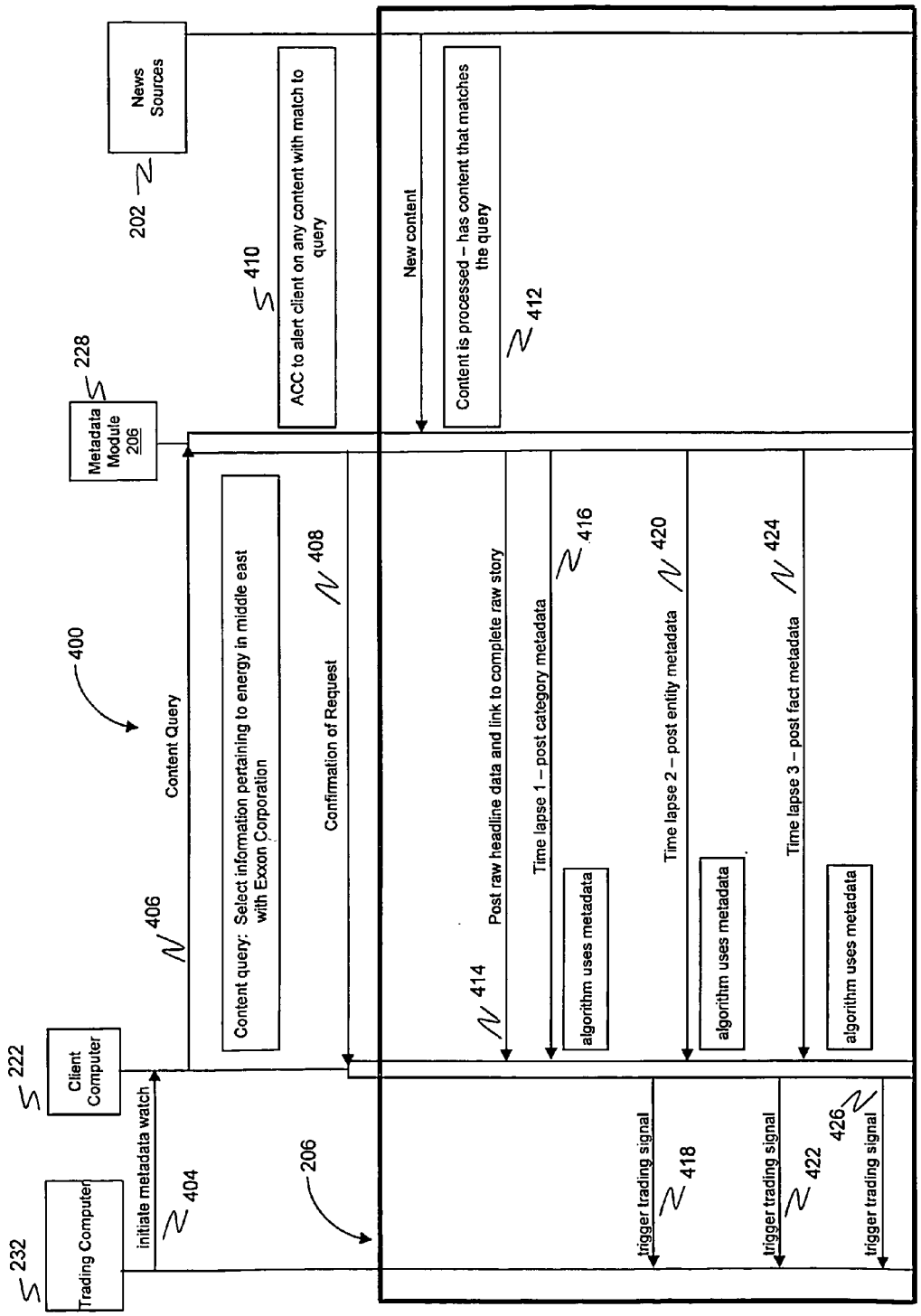
FIG. 4 is an example of a sequence diagram of an embodiment of the invention, illustrating an exemplary message flow between a trading system, a client computer, a metadata module, and a news source.

FIG. 4, generally at 400, is a sequence diagram of an embodiment of the invention, illustrating an exemplary runtime scenario of a message flow between a trading computer 232, a client application 230 running in client computer 222, metadata module 206 running on computer 228, and news sources 202. In the sequence diagram 400 shown in FIG. 4, the horizontal dimension is used to represent message flow and the top-to-bottom vertical dimension is used to represent time.

More particularly, trading computer 232 will transmit a metadata watch 404 to client computer 222. In response to the received metadata watch 404, client computer 222 can initiate a content query 406 with client application 230 running on client computer 222. Metadata module 206 will provide the metadata of the news sources 202 to client application 230. Client application 230 then, in turn, will process the query from trading computer 232 and metadata from metadata module 206 to trigger the trading signal to trading computer 232. In FIG. 4, client computer 222 has initiated a content query pertaining to news stories 102 whose subject matter pertains or relates to energy in the middle east in connection with Exxon Corporation. Clearly, any number criteria can be specified in either the metadata watch 404 or the content query 406. That is, trading computer 232 can transmit any number of metadata watches to client computer 222. Similarly, client computer 222 can also transmit any number of content queries 406 to computer 228.

Upon receipt of a content query 406, metadata module 206 running on computer 228 will transmit an alert 410 to client computer 222 regarding any news stories 102 that contain content that match or correspond to a content query 406. Computer 228 initially transmits a confirmation 408 to client computer 222, indicating that computer 228 has received and will act upon the content query 406 transmitted by client computer 222 to computer 228.

Upon transmission of the confirmation request 408 by computer 228 to client computer 222, metadata module 206 commences processing of unstructured text, such as a news stories 102, transmitted to computer 228, in accordance with the content query 406. As news stories 102 are received by computer 228, as shown at 412, categorization module 208 will identify whether the headline data 104 and/or story body 106 match or correspond to a content query 406. Computer 228 could transmit, for example, the headline data 104 and a link to the news story 102 to client computer 222, as indicated at 414. Computer 228 will also utilize categorization module 208 to transmit to client 222 the categorization metadata associated with the news story 102, as indicated at 416. The categorization metadata will be stored in metadata archive 214, and client metadata archive 226, as described in connection with FIG. 2.

As shown at 416, client computer 222 receives categorization metadata associated with the news story 102, as determined by categorization metadata module 208. Using the categorization metadata, client computer 222 can determine whether to initiate a trade based on the content of the categorization metadata associated with news story 102. If client computer 222 determines that a trade should be initiated, client computer 222 can transmit a trading signal 418 to trading computer 232. For example, client application 230 shown in FIG. 2 can determine, for example, whether a topic such as energy in the middle east is currently receiving a statistically significant increase (or decrease) of mentioning. Client computer 222 could, for example, provide instructions to execute a trade as indicated by trading signal 418 to buy or sell a predetermined volume of Exxon (or other) stock based on a statistically significant (e.g., 10%) increase (or decrease) of topics pertaining to energy in the middle east, relative to historical patterns. In addition to or in lieu of client computer 222 transmitting a trading signal 418 to trading computer 232, client computer 222 could also send alerts to predetermined individuals and/or organizations based on a statistically significant increase or decrease in mentioning of a topic such as energy in the middle east.

Entity extraction module 210 also processes unstructured text, such as a news stories 102, transmitted to computer 228, in accordance with the content query 406. As news stories 102 are received by computer 228, as shown at 412, entity extraction module 210 will identify the subject matter associated with the headline data 104, and will also identify any entities, such as a corporation of individual, found in the headline data 104 and/or story body 106 that match or correspond to a content query 406. Computer 228 will utilize entity extraction module 210 to transmit to client 222 the entity metadata associated with the news story 102 that matches or corresponds to a content query 406, as shown at 420. The entity metadata will be stored in metadata archive 214, and client metadata archive 226, as described in connection with FIG. 2.

As shown at 420, client computer 222 receives entity metadata associated with the news story 102, as determined by entity metadata module 210. Using the entity metadata, client computer 222 can determine whether to initiate a trade based on the combined content of the entity metadata and categorization metadata associated with news story 102. If client computer 222 determines that a trade should be initiated, client computer 222 can transmit a trading signal 422 to trading computer 232. For example, client application 230 shown in FIG. 2 can determine, for example, whether a topic such as energy in the middle east in connection with Exxon Corporation is currently receiving a statistically significant increase (or decrease) of mentioning. Client computer 222 could, for example, provide instructions to execute a trade as indicated by trading signal 422 to buy or sell a predetermined volume of Exxon stock based on a statistically significant (e.g., 10%) increase (or decrease) of topics pertaining to energy in the middle east in connection with Exxon Corporation, relative to historical patterns. In addition to or in lieu of client computer 222 transmitting a trading signal 422 to trading computer 232, client computer 222 could also send alerts to predetermined individuals and/or organizations based on a statistically significant increase or decrease in mentioning of a topic such as energy in the middle east in connection with Exxon Corporation.

Fact extraction module 212 also processes unstructured text, such as a news stories 102, transmitted to computer 228, in accordance with the content query 406. As news stories 102 are received by computer 228, as shown at 412, fact extraction module 212 will identify facts that match or correspond to a content query 406. Computer 228 will utilize fact extraction module 212 to transmit to client computer 222 the fact metadata 424 associated with the news story 102. The fact metadata will be stored in metadata archive 214, and client metadata archive 226, as described in connection with FIG. 2.

As shown at 424, client computer 222 receives fact metadata associated with the news story 102, as determined by fact metadata module 212. Using the fact metadata in combination with the entity metadata and categorization metadata, client computer 222 can determine whether to initiate a trade based on the combined content of the fact metadata, entity metadata and categorization metadata that is associated with a news story 102. If client computer 222 determines that a trade should be initiated, client computer 222 can transmit a trading signal 426 to trading computer 232.

For example, client application 230 shown in FIG. 2 can determine whether to execute a trade, for example, based on a topic such as energy in the middle east in connection with fact metadata derived from the news story 102, indicating that Exxon Corporation is currently decreasing oil exploration in the middle east. Client application 230 could use the categorization metadata, the entity metadata, and the fact metadata to determine whether to execute a trade, as indicated by trading signal 426, to buy or sell a predetermined volume of Exxon stock based on a statistically significant (e.g., 10%) increase (or decrease) of topics pertaining to energy in the middle east in connection with Exxon Corporation, relative to historical patterns, in combination with the fact metadata indicating that Exxon is currently decreasing oil exploration in the middle east. In addition to or in lieu of client computer 222 transmitting a trading signal 426 to trading computer 232, client computer 222 could also send alerts to predetermined individuals and/or organizations based on a statistically significant increase or decrease in mentioning of a topic such as energy in the middle east in connection with the fact metadata indicating that Exxon Corporation is currently decreasing oil exploration in the middle east.

Figure 5:
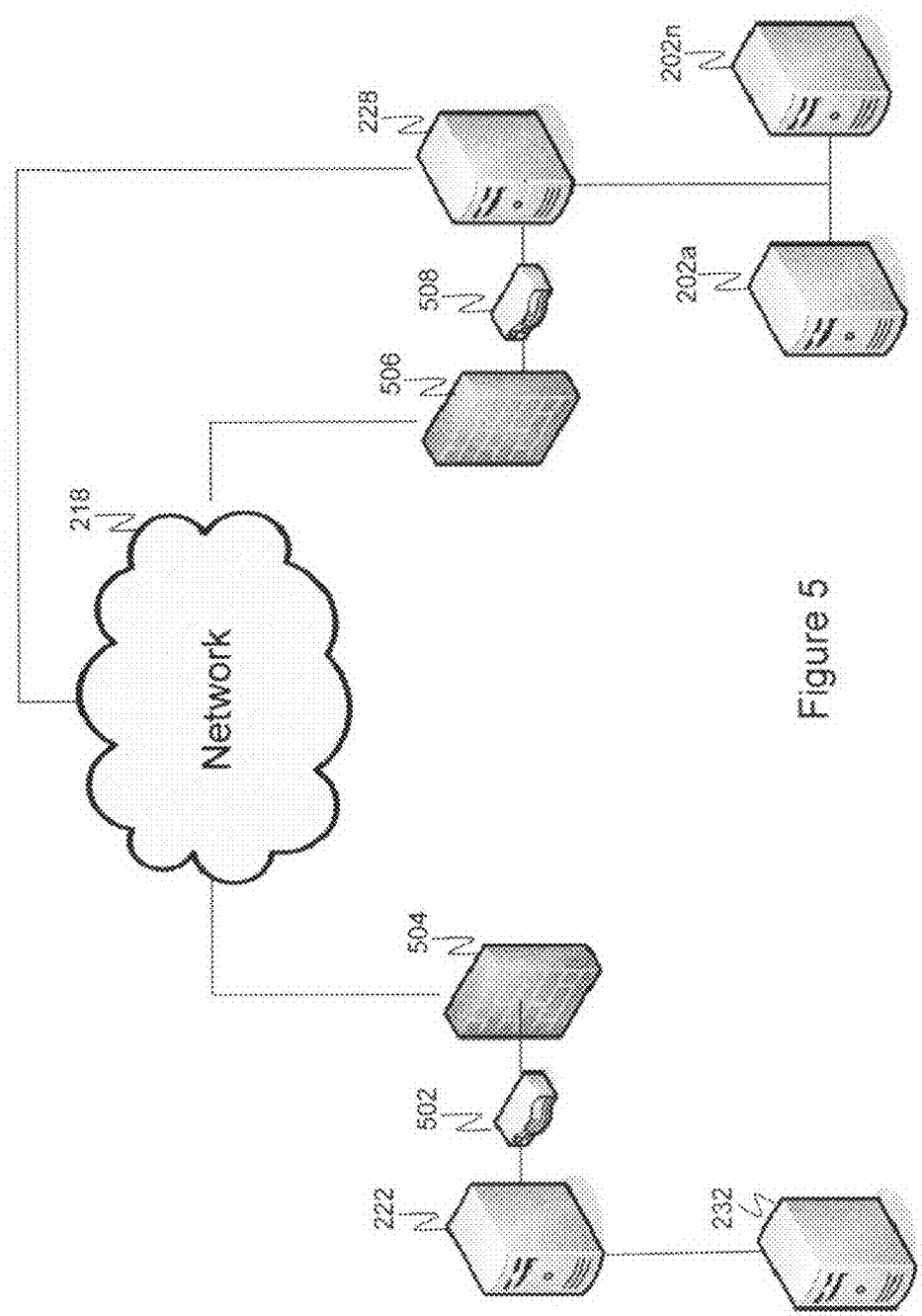
FIG. 5 is an exemplary network configuration that can be utilized to implement aspects of the present invention.

FIG. 5 is an exemplary network configuration that can be utilized to implement aspects of the present invention. A potential operational scenario is described as follows. As described in connection with FIG. 4, trading computer 232 will transmit a metadata watch 404 to client computer 222. In response to the received metadata watch 404, client computer 222 can transmit one or more content query 406 of interest to metadata module 206 running on general purpose computer 228. For example, a content query can pertain or relate to energy in the middle east in connection with Exxon Corporation. In turn, metadata module 206 will transmit alerts on specific content categories onto a queue of the client computer 222, as indicated at 414, 416, 420 and 424.

Client computer 222 can establish a stateful connection between computer 228 and client computer 222 using network 218. Network 218 can be, for example, a wide area network (WAN), a virtual private network (VPN) and/or private line to establish a direct point to point data connection with computer 228 for higher speeds and lower latency. Client computer 222 monitors an incoming message queue for new alerts from computer 228, which runs metadata module 206, based on a query for a specific content query.

News source computers 202a-n can include content from, for example, the web, an in-house editorial system, and/or a third party system such as Reuters or Associated Press. As computer 228 receives unstructured text 102 from news source computers 202a-n, metadata module 206 will process the metadata associated with each item of unstructured text 102. As content 102 arrives at computer 228, computer 228 will transmit an initial alert, as shown at 414, to client computer 222 containing the raw data and a unique ID 301 for the content item, as indicated at 414. Computer 228 may also transmit one or more alerts to client computers 222 based on one or more content queries 406 associated with each respective client computer 222. The alerts are shown at 416, 420 and 424.

For example, as categorization coding module 208 completes generation of metadata for an item of unstructured text 102, computer 228 will transmit a first set of metadata (e.g. categorization metadata) with a unique ID 301, as shown at 416. Similarly, as entity extraction module 210 completes generation of metadata for the same item of unstructured text 102, computer 228 will transmit a second set of metadata (e.g. entity metadata) with the same unique ID 301, as shown at 420. Finally, as fact extraction module 212 completes generation of metadata for the same item of unstructured text 102, computer 228 will transmit a third second set of metadata (e.g. fact metadata) with the same unique ID 301, as shown at 424. Client computer 222 may use any combination of metadata 416, 420, 424.

Upon receipt of data 414 pertaining to unstructured text 102 and metadata 416, 420, 424, client computer 222 may use the data 414 and/or metadata 416, 420, 424 to determine whether to transmit trading signals to 418, 422, 426 to trading computer 232. Upon receipt of a trading signal 418, 422, 426, trading computer 232 can initiate trades, for example of stocks, bonds or other financial securities based on trading signals 418, 422 and/or 426.

As shown in FIG. 5, client computer 222 can use standard networking equipment such as a router 502 and firewall 504 to provide connectivity with network 218. Similarly, computer 228 can standard networking equipment such as a router 508 and firewall 506 to provide connectivity with network 218. News source computers 202a-n may similarly be operationally connected, via a network, with computer 228. Similarly, trading computer 232 may be operationally connected, via a network, with client computer 222.

Figure 6:
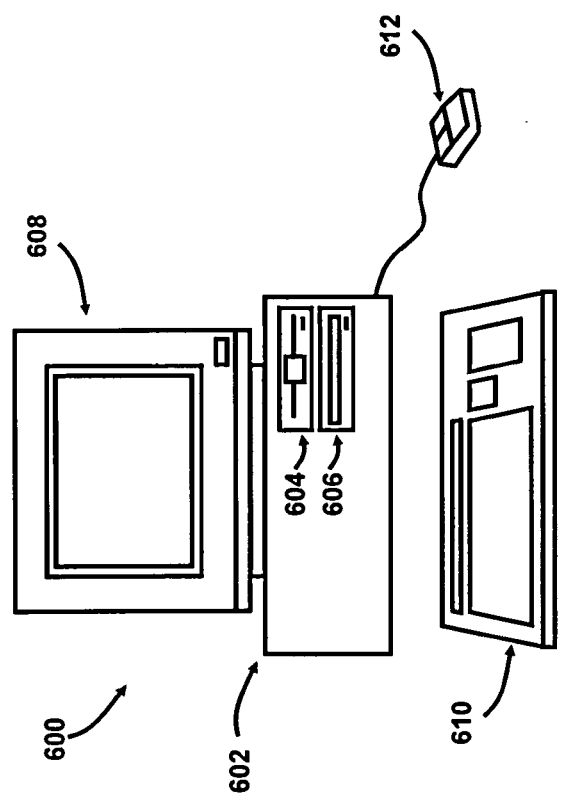
FIG. 6 is an illustrative embodiment of a computer and assorted peripherals.

FIG. 6, generally at 600, is an illustration of a main central processing unit for implementing the computer processing in accordance with a computer implemented embodiment of the present invention. The procedures described herein are presented in terms of program procedures executed on, for example, a computer 228, 202a-n, 222, 232 or network of computers 218, such as shown in FIG. 5.

Viewed externally in FIG. 6, a computer system designated by reference numeral 600 has a computer 602 having disk drives 604 and 606. Disk drive indications 604 and 606 are merely symbolic of a number of disk drives which might be accommodated by the computer system. Computer system 600, or a similar computing system, can be utilized to implement computer 228, news source computers 202a-n, client computer 222, and/or trading computer 232. Typically, these would include a floppy disk drive 604, a hard disk drive (not shown externally) and a CD ROM indicated by slot 606. The number and type of drives varies, typically with different computer configurations. Disk drives 604 and 606 are in fact optional, and for space considerations, are easily omitted from the computer system used in conjunction with the production process/apparatus described herein.

The computer system 600 also has an optional display 608 upon which information is displayed. In some situations, a keyboard 610 and a mouse 612 are provided as input devices to interface with the central processing unit 602. Then again, for enhanced portability, keyboard 610 may be a limited function keyboard, or omitted in its entirety. In addition, mouse 612 optionally is a touch pad control device, or a track ball device, or even omitted in its entirety as well. In addition, the computer system 600 also optionally includes at least one infrared transmitter and/or infrared received for either transmitting and/or receiving infrared signals, as described below.

Although computer system 600 is illustrated having a single processor, a single hard disk drive and a single local memory, the system 600 is optionally suitably equipped with any multitude or combination of processors or storage devices. Computer system 600 is, in point of fact, able to be replaced by, or combined with, any suitable processing system operative in accordance with the principles of the present invention, including sophisticated calculators, and hand-held, laptop/notebook, mini, mainframe and super computers, as well as processing system network combinations of the same.

Figure 7:
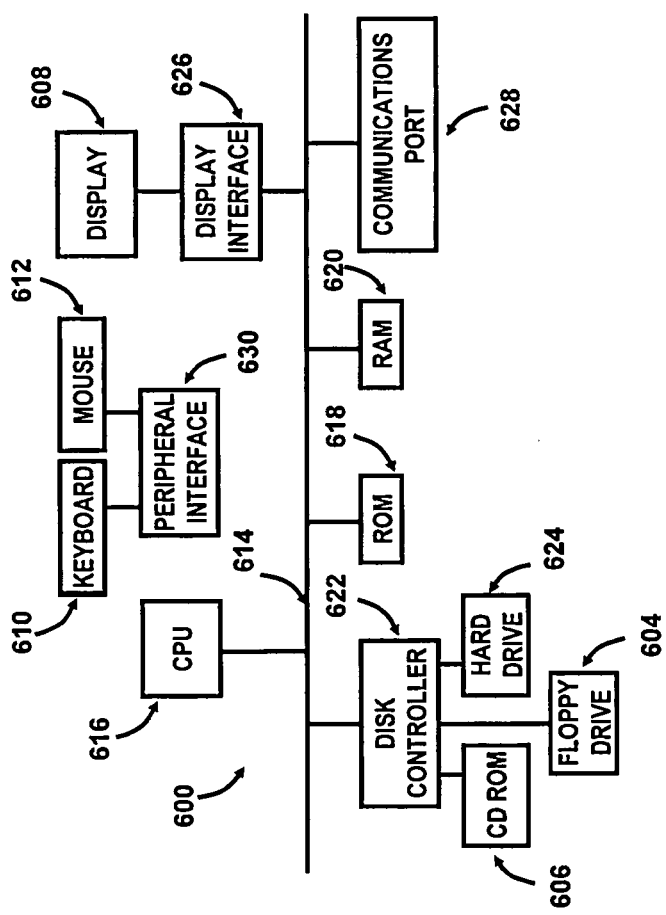
FIG. 7 is an illustrative embodiment of internal computer architecture consistent with the instant invention.

FIG. 7 illustrates a block diagram of the internal hardware of the computer system 600 of FIG. 6. A bus 614 serves as the main information highway interconnecting the other components of the computer system 600. CPU 616 is the central processing unit of the system, performing calculations and logic operations required to execute a program. Read only memory (ROM) 618 and random access memory (RAM) 620 constitute the main memory of the computer. Disk controller 622 interfaces one or more disk drives to the system bus 614. These disk drives are, for example, floppy disk drives such as 604, or CD ROM or DVD (digital video disks) drive such as 606, or internal or external hard drives (or disk) 624. As indicated previously, these various disk drives and disk controllers are optional devices.

A display interface 626 interfaces display 608 and permits information from the bus 614 to be displayed on the display 608. Again as indicated, display 608 is also an optional accessory. For example, display 608 could be substituted or omitted. Communications with external devices, for example, the components of the apparatus described herein, occurs utilizing communication port 628. For example, optical fibers and/or electrical cables and/or conductors and/or optical communication (e.g., infrared, and the like) and/or wireless communication (e.g., radio frequency (RF), and the like) can be used as the transport medium between the external devices and communication port 628. Peripheral interface 630 interfaces the keyboard 610 and the mouse 612, permitting input data to be transmitted to the bus 614. In addition to the standard components of the computer, the computer also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system optionally uses a low power radio transmitter and/or a low power radio receiver. The low power radio transmitter transmits the signal for reception by components of the production process, and receives signals from the components via the low power radio receiver. The low power radio transmitter and/or receiver are standard devices in industry.

Aspects of the process of embodiments of the present invention may be implemented in hardware and/or software form and may, for example, include computer readable program code tangibly embodied in a computer readable medium such as a processor 616, or memory 618, 620 coupled to the processor. In other instances, aspects of embodiments of the present invention execute computer readable program code stored on a medium such as a hard drive disk 624, floppy disk 604, and/or any other form of memory capable of storing computer readable program code, such as a CD ROM 606. Certain executable and non-executable portions of the files that are used by embodiments of the invention may be distributed or obtained via a network (e.g., a wireless network) 218.

Figure 8:
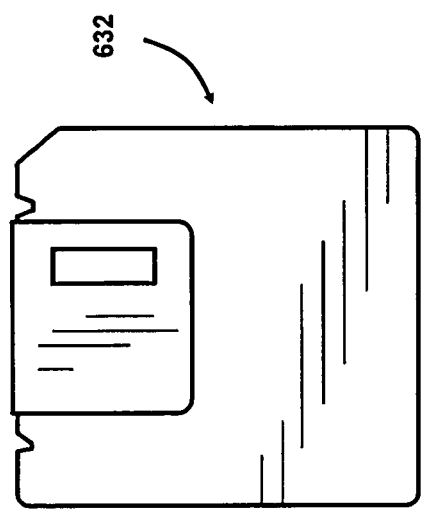
FIG. 8 is an illustrative embodiment of a memory medium.

FIG. 8 is an illustration of an exemplary memory medium 632 which can be used with disk drives illustrated in FIGS. 6 and 7. Typically, memory media such as floppy disks, or a CD ROM, or a digital video disk will contain the program information for controlling the computer to enable the various computers, e.g., 232, 222, 228, 202a-n, to perform the functions described herein. Alternatively, ROM 618 and/or RAM 620 illustrated in FIGS. 6 and 7 can also be used to store the program information that is used to instruct the central processing unit to perform the operations associated with the production process.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration is, for example, arranged according to the multiple instruction multiple data (MIMD) multiprocessor format for additional computing efficiency. The details of this form of computer architecture are disclosed in greater detail in, for example, U.S. Pat. No. 5,163,131; Boxer, A., "Where Buses Cannot Go", IEEE Spectrum, February 1995, pp. 41-45; and Barroso, L. A. et al., "RPM: A Rapid Prototyping Engine for Multiprocessor Systems", IEEE Computer, February 1995, pp. 26-34, each of which are incorporated herein by reference.

In alternate preferred embodiments, the above-identified processor, and, in particular, CPU 616, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

The structures shown and discussed in embodiments of the invention are exemplary only and the functions performed by these structures may be performed by any number of structures. For example, certain functions may be performed by a single physical unit, or may be allocated across any number of different physical units. All such possible variations are within the scope and spirit of embodiments of the invention and the appended claims.

Embodiments of the present invention have been described for the purpose of illustration. Persons skilled in the art will recognize from this description that the described embodiments are not limiting, and may be practiced with modifications and alterations limited only by the spirit and scope of the appended claims which are intended to cover such modifications and alterations, so as to afford broad protection to the various embodiments of invention and their equivalents.

Having thus described my invention, what I claim as new and desire to secure by Letters Patent is as follows:

1. A method implemented on a computer system comprising at least one processor and a storage device, comprising:
    (a) receiving a set of alphanumeric information on a single storage device;
    (b) using a first criteria for processing alphanumeric information and generating metadata to generate a first set of metadata associated with a first subset of the received alphanumeric information;
    (c) using a second criteria for processing alphanumeric information and generating metadata different than the first criteria to generate a second set of metadata associated with a second subset of the received alphanumeric information, wherein the first subset of alphanumeric information is different than the second subset of alphanumeric information;
    (d) using a third criteria for processing alphanumeric information and generating metadata different than the first criteria and the second criteria to generate a third set of metadata associated with a third subset of the received alphanumeric information, wherein the third subset of alphanumeric information is different than the first and second subsets of alphanumeric information; and
    (e) transmitting, to a user computer, the first set of metadata at a first time, the second set of metadata at a second time subsequent to the first time, and the third set of metadata at a third time subsequent to the second time;
    wherein at least one of the first set of metadata, the second set of metadata, and the third set of metadata causes execution of an automated security trade.

2. The method of claim 1, wherein the alphanumeric information is a news story.

3. The method of claim 2, wherein the news story is a financial news story.

4. The method of claim 1. wherein the second time is no later than one hour after the first time.

5. The method of claim 1, wherein the second time is no later than five seconds after the first time.

6. The method of claim 1, wherein the first set of metadata pertains to a subject matter of the alphanumeric information, the second set of metadata pertains to an entity identified within the alphanumeric information, and the third set of metadata pertains to a fact identified within the alphanumeric information.

7. The method of claim 6, wherein the first set of metadata causes execution of an automated security trade.

8. The method of claim 6, wherein the second set of metadata causes execution of an automated security trade.

9. The method of claim 1 wherein the alphanumeric information is an email.

10. The method of claim 1 wherein the alphanumeric information is an instant message.

11. The method of claim 1 wherein the alphanumeric information is an electronic document.

12. The method of claim 1, wherein the at least one of the first set of metadata, the second set of metadata, and the third set of metadata causes execution of an automated security trade in response to a statistically significant change in the at least one of the first set of metadata, the second set of metadata, and the third set of metadata.

13. The method of claim 1 , wherein the third set of metadata causes execution of an automated security trade.

14. . A computer system comprising:
    a memory;
    a processor in communication with the memory, wherein the computer system is configured for receiving a set of alphanumeric information on a single storage device;
        using a first criteria for processing alphanumeric information and generating metadata to generate a first set of metadata associated with a first subset of the received. alphanumeric information;
        using a second criteria for processing alphanumeric information and generating metadata different than the first criteria to generate a second set of metadata associated with a second subset of the received alphanumeric information, wherein the first subset of information is different than the second subset of information;
        using a third criteria for processing alphanumeric information and generating metadata different than the first criteria and the second criteria to generate a third set of metadata associated with a third subset of the received alphanumeric information, wherein the third subset of information is different than the first and second subsets of information;
        transmitting, to a user computer, the first set of metadata at a first time, the second set of metadata at a second time subsequent to the first time, and the third set of metadata at a third time subsequent to the second time; and
        wherein at least one of the first set of metadata, the second set of metadata, and the third set of metadata causes execution of an automated security trade.

15. The system of claim 14, wherein the first set of metadata pertains to a subject matter of the alphanumeric information, the second set of metadata pertains to an entity identified with the alphanumeric information, and the third set of metadata pertains to a fact identified within the alphanumeric information.

16. The system according to claim 15, further comprising the computer system transmitting the first set of metadata to a second computer, wherein the second computer triggers a security trade based on the first set of metadata.

17. The system according to claim 16, wherein the first set of metadata is transmitted to the second computer via a network.

18. The system according to claim 16, further comprising the computer system transmitting the second set of metadata to a second computer, wherein the second computer triggers a security trade based on the second set of metadata.

19. The system according to claim 18, wherein the second time is no later than 5 seconds after the first time.

20. The system according to claim 14, further comprising the computer system transmitting the third set of metadata to a second computer, wherein the second computer triggers a security trade based on the third set of metadata.

* * * * *